(12) United States Patent
Shen

(10) Patent No.: US 12,308,641 B2
(45) Date of Patent: May 20, 2025

(54) PNEUMATIC ENERGY SUPPLY POWER FOR ULTRA-HIGH VOLTAGE EQUIPMENT

(71) Applicant: SUZHOU KANGKAI ELECTRIC CO., LTD., Jiangsu (CN)

(72) Inventor: Yongfu Shen, Jiangsu (CN)

(73) Assignee: SUZHOU KANGKAI ELECTRIC CO., LTD., Jiangsu (CN)

( * ) Notice: Subject to any disclaimer, the term of this patent is extended or adjusted under 35 U.S.C. 154(b) by 205 days.

(21) Appl. No.: 18/016,934

(22) PCT Filed: Dec. 30, 2020

(86) PCT No.: PCT/CN2020/141315
§ 371 (c)(1),
(2) Date: Jan. 19, 2023

(87) PCT Pub. No.: WO2022/021793
PCT Pub. Date: Feb. 3, 2022

(65) Prior Publication Data
US 2024/0039326 A1    Feb. 1, 2024

(30) Foreign Application Priority Data
Jul. 30, 2020    (CN) .......................... 202010751646.9

(51) Int. Cl.
*H02J 15/00*    (2006.01)
*H02K 47/20*    (2006.01)

(52) U.S. Cl.
CPC ............ *H02J 15/006* (2013.01); *H02K 47/20* (2013.01)

(58) Field of Classification Search
CPC .......... B60K 6/00; H02K 47/20; H02J 15/006
See application file for complete search history.

(56) References Cited

U.S. PATENT DOCUMENTS

2010/0307156 A1* 12/2010 Bollinger .............. H02J 15/006
                                                             60/682
2011/0049909 A1*  3/2011 Domes .................... F03D 9/11
                                                             290/1 R

FOREIGN PATENT DOCUMENTS

CN    101920660 A    12/2010
CN    102501752 A     6/2012
(Continued)

OTHER PUBLICATIONS

International Search Report for PCT/CN2020/141315, mailed on Apr. 12, 2021.

*Primary Examiner* — Abiy Teka
(74) *Attorney, Agent, or Firm* — Schmeiser, Olsen & Watts LLP

(57) ABSTRACT

A pneumatic energy supplying power for ultra-high voltage equipment, including a low voltage unit, an ultra-high voltage unit, and a connection unit for connecting the low voltage unit and the ultra-high voltage unit is provided. The low voltage unit includes a conversion module of low voltage side used for converting an electrical energy into a mechanical energy, and a gas compression pump driven by the conversion module of low voltage side to compress gas and output compressed gas. The ultra-high voltage unit includes a pneumatic motor driven by the compressed gas, and a conversion module of ultra-high voltage side driven by the pneumatic motor to generate power and output a power for load to the ultra-high voltage equipment. The connection unit includes an insulating gas-conveying pipe connecting the gas compression pump and the pneumatic motor to convey the compressed gas.

9 Claims, 1 Drawing Sheet

(56) References Cited

FOREIGN PATENT DOCUMENTS

| CN | 103899360 A | 7/2014 |
| CN | 104266809 A | 1/2015 |
| CN | 111799792 A | 10/2020 |
| WO | 2017084792 A1 | 5/2017 |
| WO | 2018095446 A1 | 5/2018 |

* cited by examiner

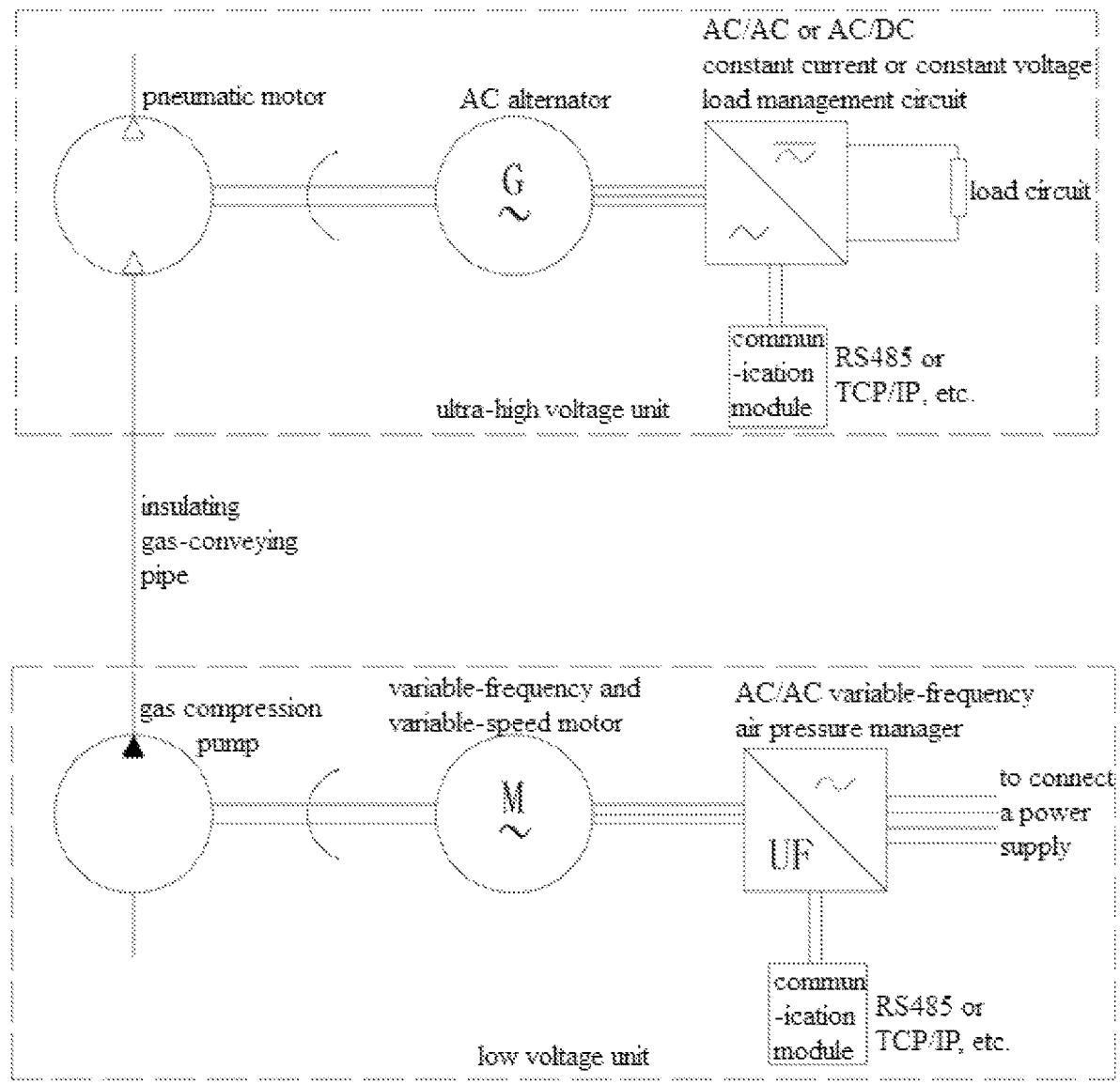

PNEUMATIC ENERGY SUPPLY POWER FOR ULTRA-HIGH VOLTAGE EQUIPMENT

CROSS-REFERENCE TO RELATED APPLICATIONS

This application claims priority to PCT Application No. PCT/CN2020/141315, having a filing date of Dec. 30, 2020, which claims priority to CN Application No. 202010751646.9, having a filing date of Jul. 30, 2020, the entire contents both of which are hereby incorporated by reference.

FIELD OF TECHNOLOGY

The following relates to the field of power supply technology, in particular, relates to a pneumatic energy supplying power for ultra-high voltage equipment.

BACKGROUND

On Jun. 25, 2020, the successful networking of Zhangbei 500 kV flexible direct current (DC) power grid test demonstration project means that the DC UHV (Ultra High Voltage) networking technology tends to be mature, and the large-scale networking of DC UHV lines is about to begin. Followed by DC 800 kV and DC 1100 kV UHV power grid networking is about to advance. According to the technical requirements of DC 800 kV and DC 1100 kV UHV power grids, UHV equipment has higher and higher requirements for insulation withstand voltage stress of power supply equipment. The traditional isolation power supply has been unable to meet the requirements of insulation withstand voltage stress of UHV equipment, which will become a constraint to the progress of networking technology of DC 800 kV and DC 1100 kV UHV power grids. Therefore, in order to meet the requirements of insulation withstand voltage stress of power supply equipment and improve the operational reliability of UHV DC grid, it is necessary to design a new power supply device.

SUMMARY

An aspect relates to a pneumatic energy supplying power with higher efficiency, higher withstand voltage, higher reliability, and suitable for supplying energy to ultra-high voltage equipment.

To achieve the above purpose, a technical solution employed by the present disclosure is:
- a pneumatic energy supplying power for ultra-high voltage equipment, used for supplying energy to ultra-high voltage equipment, comprises a low voltage unit, an ultra-high voltage unit, and a connection unit for connecting the low voltage unit to the ultra-high voltage unit;
- the low voltage unit comprises a conversion module of low voltage side used for converting an electrical energy into a mechanical energy, and a gas compression pump driven by the conversion module of low voltage side to compress gas and output the compressed gas;
- the ultra-high voltage unit comprises a pneumatic motor driven by the compressed gas, and a conversion module of ultra-high voltage side driven by the pneumatic motor to generate power and output a power for load to the ultra-high voltage equipment;
- the connection unit comprises an insulating gas-conveying pipe connecting the gas compression pump and the pneumatic motor to convey the compressed gas.

The conversion module of low voltage side comprises:
- an AC/AC air pressure manager obtaining electrical energy from a low-voltage power supply and converting the electrical energy to an alternating current power for motor, and indirectly controlling air pressure and flow of the compressed gas output from the gas compression pump;
- an electric motor operating by using the alternating current power for motor;
- the gas compression pump is driven by the electric motor and compresses gas and outputs the compressed gas.

The AC/AC air pressure manager is an AC/AC variable-frequency air pressure manager.

The electric motor is a variable-frequency and variable-speed motor.

The low voltage unit further comprises a communication module of low voltage side for communicating the AC/AC air pressure manager and the ultra-high voltage unit.

The conversion module of ultra-high voltage side comprises:
- an alternator driven by the pneumatic motor to generate power and output a generated power;
- an AC/AC constant current or constant voltage load management circuit or an AC/DC constant current or constant voltage load management circuit, for converting the generated power to a direct-current power for load to the ultra-high voltage equipment.

The ultra-high voltage side unit further comprises a communication module of ultra-high voltage side for communicating the AC/AC constant current or constant voltage load management circuit or the AC/DC constant current or constant voltage load management circuit and the low voltage unit.

The distance between the low voltage unit and the ultra-high voltage side unit is 5 to 50 meters.

Due to the use of the above technical solutions, the present disclosure has the following advantages over the conventional art: According to the present disclosure, the compressed gas is used to transmit energy, the energy conversion efficiency is higher, the withstanding voltage is higher, the stability is good, the operation is safe and reliable, and it is suitable for supplying electric energy to ultra-high voltage equipment.

BRIEF DESCRIPTION

Some of the embodiments will be described in detail, with references to the following FIGURES, wherein like designations denote like members, wherein:

FIG. 1 shows a schematic diagram of a pneumatic energy supply power for ultra-high voltage equipment according to the present disclosure.

DETAILED DESCRIPTION

The present disclosure is further described below combining with embodiments shown in the accompanying drawings.

Embodiment 1: As shown in FIG. 1, a pneumatic energy supplying power for ultra-high voltage equipment, used for supplying electric energy to ultra-high voltage equipment, comprises a low voltage unit, an ultra-high voltage unit, and a connection unit.

The low voltage unit comprises a conversion module of low voltage side and a gas compression pump. The conversion module of low voltage side is connected to a power supply for converting an electrical energy into a mechanical energy. The conversion module of low voltage side comprises an AC/AC air pressure manager and an electric motor. The AC/AC air pressure manager is an AC/AC variable-frequency air pressure manager, obtains electrical energy from a low-voltage power supply and converts it to a alternating current power for motor, and indirectly controls the air pressure and flow of the compressed gas output from the gas compression pump, so that the stability of the output voltage can be improved. The electric motor is a variable-frequency and variable-speed motor, which operates by using the alternating current power for motor from the AC/AC variable-frequency air pressure manager to output the mechanical energy. The gas compression pump is connected to the variable-frequency and variable-speed motor, so that it is driven by the variable-frequency and variable-speed motor of the conversion module of low voltage side to compress gas and output the compressed gas. In this embodiment, the gas compression pump is used to compress air, so the gas compression pump is an air compression pump.

The conversion module of ultra-high voltage side comprises a pneumatic motor and a conversion module of ultra-high voltage side. The pneumatic motor is driven by the compressed gas. The conversion module of ultra-high voltage side is driven by the pneumatic motor to generate power and output a power for load to ultra-high voltage equipment. The conversion module of ultra-high voltage side comprises an alternator, and it further comprises an AC/AC constant current or constant voltage load management circuit or an AC/DC constant current or constant voltage load management circuit. The alternator is driven by the pneumatic motor to generate power and output a generated power, the AC/AC constant current or constant voltage load management circuit or the AC/DC constant current or constant voltage load management circuit is connected to the alternator, so that the AC/AC constant current or constant voltage load management circuit is used to convert the generated power to an alternating-current power for load and provide it to the ultra-high voltage equipment (i.e., the load), and the AC/DC constant current or constant voltage load management circuit is used to convert the generated power to a direct-current power for load and provide it to the ultra-high voltage equipment (i.e., the load).

The connection unit is used to connect the gas compression pump (air compression pump) of the low voltage unit and the pneumatic motor of the ultra-high voltage unit, and the connection unit comprises an insulating gas-conveying pipe connecting the gas compression pump and the pneumatic motor and conveying the compressed gas (compressed air). The distance between the low voltage unit and the ultra-high voltage unit is usually 5 to 50 meters, or may also be greater than 50 meters. The insulation voltage withstanding stress from the ultra-high voltage side to the low voltage side is mainly borne by the insulating gas conveying pipe.

In addition, the low voltage unit further comprises a communication module of low voltage side connecting to the AC/AC air pressure manager for enabling communication between the AC/AC air pressure manager and the ultra-high voltage unit. The ultra-high voltage side unit further comprises a communication module of ultra-high voltage side connecting to the AC/AC constant current or constant voltage load management circuit or the AC/DC constant current or constant voltage load management circuit for enabling communication between the AC/AC constant current or constant voltage load management circuit or the AC/DC constant current or constant voltage load management circuit and the low voltage unit. These two communication units can realize returning the generator working condition and load working condition of the high-voltage side to the low voltage side, and manage the generator and load through the low voltage side. The low voltage side/ultra-high voltage side communication module can use RS485 or TCP/IP module, etc.

The pneumatic energy supplying power for ultra-high voltage equipment mentioned above realizes the use of compressed gas (compressed air) to transmit energy, the use of gas compression pump (air compression pump) to compress normal-pressure gas (air) as power source and transmit to the ultra-high voltage side, with the energy conversion efficiency higher than the functional efficiency of other ultra-high voltage equipment. Based on that the distance from its low voltage unit to the ultra-high voltage side unit is 5 to over 50 meters, the voltage withstanding from its low voltage side to the ultra-high voltage side can range from 350 kV to over 3500 kV.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A pneumatic energy supplying power for ultra-high voltage equipment, used for supplying energy to the ultra-high voltage equipment, comprising:
    a low voltage unit;
    an ultra-high voltage unit; and
    a connection unit for connecting the low voltage unit and the ultra-high voltage unit;
wherein the low voltage unit comprises a conversion module of low voltage side used for converting an electrical energy into a mechanical energy, and a gas compression pump driven by the conversion module of low voltage side to compress gas and output compressed gas;
wherein the ultra-high voltage unit comprises a pneumatic motor driven by the compressed gas, and a conversion module of ultra-high voltage side driven by the pneumatic motor to generate power and output a power for load to the ultra-high voltage equipment;
wherein the connection unit comprises an insulating gas-conveying pipe connecting the gas compression pump and the pneumatic motor to convey the compressed gas;
    wherein the conversion module of low voltage side comprises:
    an AC/AC air pressure manager obtaining electrical energy from a low-voltage power supply and converting the electrical energy to an alternating current power for motor, and indirectly controlling air pressure and flow of the compressed gas output from the gas compression pump;
    an electric motor operating by using the alternating current power for motor; and
    wherein the gas compression pump is driven by the electric motor and compresses gas and outputs the compressed gas.

2. The pneumatic energy supplying power for ultra-high voltage equipment according to claim 1, wherein the AC/AC air pressure manager is an AC/AC variable-frequency air pressure manager.

3. The pneumatic energy supplying power for ultra-high voltage equipment according to claim 2, wherein the electric motor is a variable-frequency and variable-speed motor.

4. The pneumatic energy supplying power for ultra-high voltage equipment according to claim 1, wherein the low voltage unit further comprises a communication module of low voltage side for communicating the AC/AC air pressure manager and the ultra-high voltage unit.

5. The pneumatic energy supplying power for ultra-high voltage equipment according to claim 1, wherein the conversion module of ultra-high voltage side comprises:
   an alternator driven by the pneumatic motor to generate power and output a generated power; and
   an AC/AC constant current or constant voltage load management circuit or an AC/DC constant current or constant voltage load management circuit, for converting the generated power to a direct-current power for load to the ultra-high voltage equipment.

6. The pneumatic energy supplying power for ultra-high voltage equipment according to claim 5, wherein the ultra-high voltage unit further comprises a communication module of ultra-high voltage side for communicating the AC/AC constant current or constant voltage load management circuit or the AC/DC constant current or constant voltage load management circuit and the low voltage unit.

7. The pneumatic energy supplying power for ultra-high voltage equipment according to claim 1, wherein a distance between the low voltage unit and the ultra-high voltage unit is 5 to 50 meters.

8. A pneumatic energy supplying power for ultra-high voltage equipment, used for supplying energy to the ultra-high voltage equipment, comprising:
   a low voltage unit;
   an ultra-high voltage unit; and
   a connection unit for connecting the low voltage unit and the ultra-high voltage unit;
wherein the low voltage unit comprises a conversion module of low voltage side used for converting an electrical energy into a mechanical energy, and a gas compression pump driven by the conversion module of low voltage side to compress gas and output compressed gas;
wherein the ultra-high voltage unit comprises a pneumatic motor driven by the compressed gas, and a conversion module of ultra-high voltage side driven by the pneumatic motor to generate power and output a power for load to the ultra-high voltage equipment;
wherein the connection unit comprises an insulating gas-conveying pipe connecting the gas compression pump and the pneumatic motor to convey the compressed gas;
   wherein the conversion module of ultra-high voltage side comprises:
an alternator driven by the pneumatic motor to generate power and output a generated power; and
an AC/AC constant current or constant voltage load management circuit or an AC/DC constant current or constant voltage load management circuit, for converting the generated power to a direct-current power for load to the ultra-high voltage equipment.

9. A pneumatic energy supplying power for ultra-high voltage equipment, used for supplying energy to the ultra-high voltage equipment, comprising:
   a low voltage unit;
   an ultra-high voltage unit; and
   a connection unit for connecting the low voltage unit and the ultra-high voltage unit;
wherein the low voltage unit comprises a conversion module of low voltage side used for converting an electrical energy into a mechanical energy, and a gas compression pump driven by the conversion module of low voltage side to compress gas and output compressed gas;
wherein the ultra-high voltage unit comprises a pneumatic motor driven by the compressed gas, and a conversion module of ultra-high voltage side driven by the pneumatic motor to generate power and output a power for load to the ultra-high voltage equipment;
wherein the connection unit comprises an insulating gas-conveying pipe connecting the gas compression pump and the pneumatic motor to convey the compressed gas;
   wherein a distance between the low voltage unit and the ultra-high voltage unit is 5 to 50 meters.

* * * * *